No. 870,968. PATENTED NOV. 12, 1907.
G. L. JUNGE.
FUEL RETARDING MEMBER FOR FURNACES.
APPLICATION FILED JAN. 30, 1905.
2 SHEETS—SHEET 1.
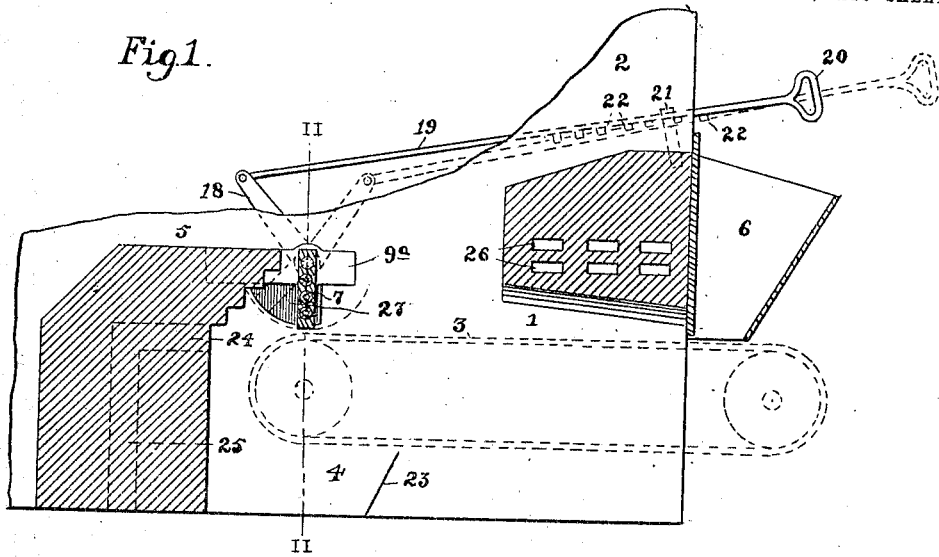
Fig. 1.
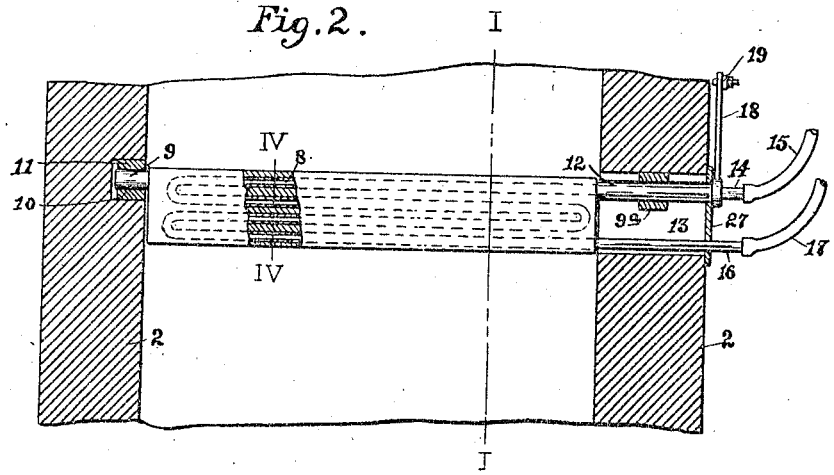
Fig. 2.
Fig. 3.  Fig. 4.  Fig. 5.  Fig. 6.
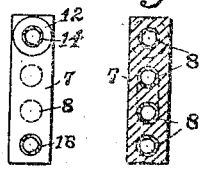
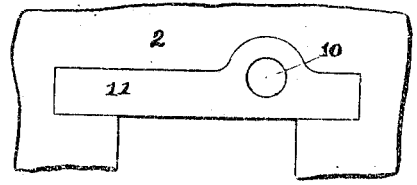
Witnesses:
Robt F. Dilworth
R B Wakefield
Inventor:
George L Junge,
by Edward A Lawrence,
his Attorney.

No. 870,968. PATENTED NOV. 12, 1907.
G. L. JUNGE.
FUEL RETARDING MEMBER FOR FURNACES.
APPLICATION FILED JAN. 30, 1905.

2 SHEETS—SHEET 2.

Witnesses:

Inventor:
George L. Junge
by Edward A. Lawrence,
his attorney.

UNITED STATES PATENT OFFICE.

GEORGE L. JUNGE, OF PITTSBURG, PENNSYLVANIA.

FUEL-RETARDING MEMBER FOR FURNACES.

No. 870,968.

Specification of Letters Patent.

Patented Nov. 12, 1907.

Application filed January 30, 1905. Serial No. 243,237.

*To all whom it may concern:*

Be it known that I, GEORGE L. JUNGE, a citizen of the United States, residing at the city of Pittsburg, in the county of Allegheny and State of Pennsylvania, have invented or discovered new and useful Improvements in Fuel-Retarding Members for Furnaces, of which the following is a specification.

Figure 8:
Figure 7:
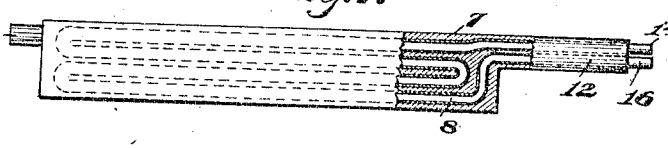
Figure 9:
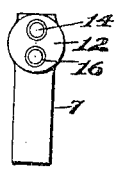
Figure 10:
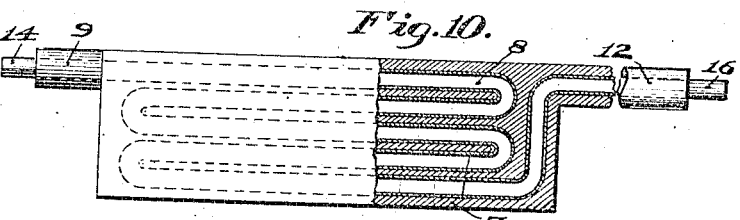
Figure 11:
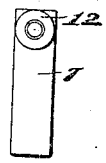
Figure 12:
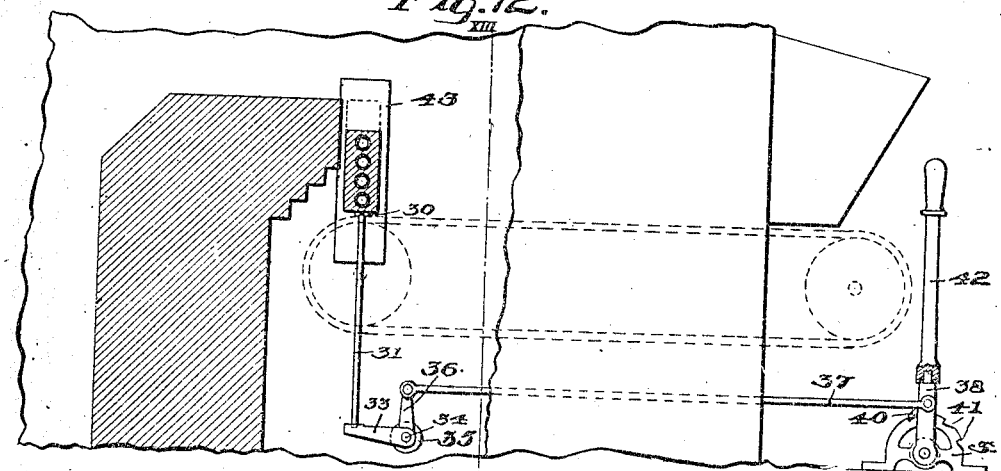
Figure 13:
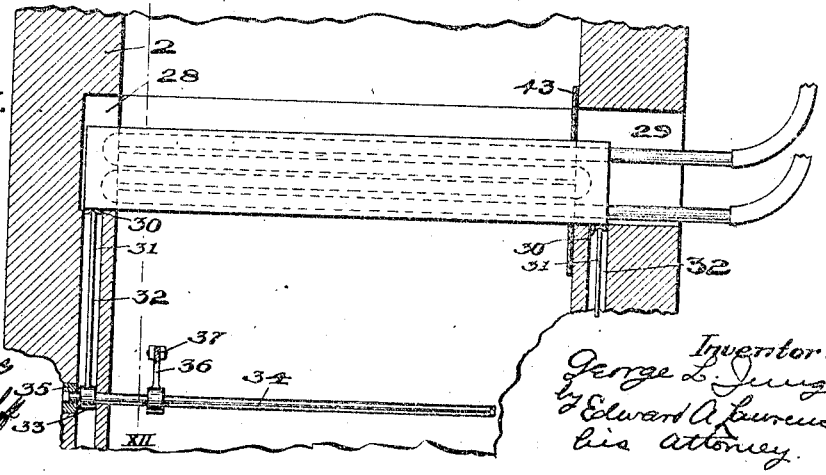

In the accompanying drawings Figure 1, is a longitudinal section along the line I—I in Fig. 2 showing a broken view of a furnace fire chamber fitted with my water back; Fig. 2 is a cross section of the same along the line II—II in Fig. 1; Fig. 3 is an end view of the fuel retarding member looking toward the left in Fig. 2, and Fig. 4 is a section of the same along the line IV—IV in Fig. 2; Fig. 5 is a side view of the form of journal block which I build into the furnace wall, a broken portion of the wall being shown for the sake of clearness, and Fig. 6 is an end view of the same; Fig. 7 is an elevation, partly in section, showing a modified arrangement of the channels or passages in the fuel retarding member, and Figs. 8 and 9 are end views of the adjacent ends of the same; Fig. 10 is a view similar to Fig. 7 showing a further modification and Fig. 11 is a view of the adjacent end of the same; Fig. 12 is a similar view to Fig. 1 but along the line XII—XII in Fig. 13, and Fig. 13 is a section along the line XIII—XIII in Fig. 12.

My invention, generally speaking, consists in a member or back intended to be located in the fire chamber of a furnace adjacent to the rear of the grate or other fuel platform and over the same, serving to retain or retard the unconsumed fuel on the grate or platform until the same is thoroughly consumed. In its operative position it is located sufficiently above the grate to permit the ashes to pass under the same down into the ash pit while the fuel is held back in the zone of fire until entirely consumed. By this means coking the coal is averted and good combustion obtained. My fuel retarding member is provided with channels or passages therethrough for the passage of water or other cooling medium to prevent the same burning out under the influence of the intense heat of the fire. I also provide means whereby the member may be raised from its lowered position to prevent clinkers or other objects from blocking the same, to vary the distance between the grate and the member and for the cleaning of the grate when desired.

The following is a detailed description of my invention as shown in the accompanying drawings which are however merely illustrative of an application of the principles of the same and therefore not intended to limit the scope thereof:—

1 is the fire chamber of a furnace of any character, of which are shown the side walls 2—2.

3 is a chain grate of any usual type or design. I show a chain grate for the sake of illustration, as my fuel retarding member is especially applicable to the same, but it will be understood that the use of my invention is not confined to that form or any distinctive form of grate.

4 is the ash pit, 5 the bridge wall and 6 the fuel hopper from which fuel is fed to the grate in the usual manner.

7 is the fuel retarding member, located transverse of the furnace adjacent to and above the rear of the grate. The fuel retarding member is preferably of cast metal and may be of oblong, as shown in the drawings, or any other convenient cross section, as desired. It preferably contains a continuous passage or channel 8 for the circulation of water or other cooling medium through the same. I prefer to construct said passage by casting the metal of the body of the fuel retarding member about a coil or length of twyer pipe of bronze or other suitable metal. Said passage is preferably constructed of a continuous length of pipe, without joints or unions, bent into the proper coils, as shown. By this means I find I can produce a satisfactory casting without flaw or imperfections caused by uneven contraction. Said fuel retarding member is pivoted in place in the fire chamber between the side walls in the following manner. At one extremity, as toward the left in Fig. 2, the fuel retarding member is provided, adjacent to the top, with a trunnion 9, preferably cast integral with the fuel retarding member, which trunnion is adapted to be journaled in the aperture 10 of the journal block 11 which is built into the side wall 2 of the furnace. At the other extremity of the fuel retarding member is a similar trunnion 12 which extends through aperture 13 in the other side wall of the furnace and is journaled in the journal block 9ª built into the wall of said furnace across said aperture.

The outlet extremity of passage 8, which I mark 14, is led through said trunnion 12 and provided at its outer extremity without the furnace with a suitable flexible water connection 15, preferably detachable. The inlet extremity of passage 8, marked 16, is preferably at the lowest portion of the fuel retarding member and extends out through aperture 13 in the furnace wall and is there provided with a flexible, detachable, water connection 17 through which water may be supplied thereto. It will thus be seen that the fuel retarding member is swung between the side walls of the furnace by means of its trunnions 9 and 12. The trunnion 12 is preferably extended somewhat outside the side wall 2 and provided at its extremity with an upwardly extending arm 18, to the upper extremity of which arm is pivoted operating lever 19, which lever extends along the side wall of the furnace to the front thereof where it is provided with a hand grasp 20.

It is evident that when lever 19 is drawn forward into the position shown in dotted lines in Fig. 1, the arm 18 would also be drawn forward and the trunnion rigid therewith would turn accordingly swinging the fuel retarding member 7 into the position shown in dotted lines in said figure, and, also, if the lever be pushed to the left of its position in full lines in said figure, the fuel retarding member would be tilted forward accordingly.

21 is a metal loop or keep, attached to the furnace wall, serving to support the free end of lever 19.

22 is a lug or projection on lever 19 adapted to engage the keep 21 and lock the lever and fuel retarding member in its normal position against being pushed aside by the pressure of fuel on the fuel retarding member. It is evident that by providing additional lugs 22ª—22ª at suitable intervals, not shown, the fuel retarding member could be locked in any desired position or height above the grate, either tilted back or front.

23 is the usual damper adjustably located transverse to the ash pit to prevent an inrush of cold air from the front of the fire chamber.

To carry off the cool air that might find its way into the rear of the ash pit and thus coke the fuel of the grate, I prefer to provide ports 24, shown in dotted lines in Fig. 1, which communicate with the chamber 25 in the wall 5 whence it is admitted to air chambers in the side walls, not shown, and drawn thence through ports 26—26 into the fire chamber in a heated state. This method of heating such cold air is described and set forth in United States Letters Patent No. 773,148, issued to me October 25th, 1904.

The operation of my fuel retarding member is as follows:—Assuming that it is in its lowered position shown in solid lines in Fig. 1 and that a current of water or other cooling medium is being passed in through inlet 16, into passage 8 and out outlet 14, it is evident that the fuel on grate 3 will be retarded at the rear until it is thoroughly consumed, while the ashes will pass under the fuel retarding member and be deposited in the ash pit. In case clinkers collect against the fuel retarding member or it is desired to clean the fire, the lever 19 is pulled forward, thus tilting the fuel retarding member rearwardly and allowing the clinkers or other material to pass unobstructed into the ash pit. If it be desired to crush the clinkers the fuel retarding member may be repeatedly and rapidly raised and lowered by means of the lever 19, thus hammering the clinkers into small pieces. By engaging the proper lug 22 or 22ª, any desired elevation above the grate may be obtained. The passage of water through my fuel retarding member enables the same to be properly cooled and prevents its destruction from the heat.

It will be seen that the aperture 13 is practically semi-circular, to permit the arc of movement of the pipe 16. To cover said aperture and prevent the inrush of cold air through the same, I prefer to provide a metal plate or apron, 27, preferably rigidly attached to trunnion 12 and of proper shape to effectually close the outer end of said aperture in all positions. A second apron, not shown, of similar design and arrangement, may, if desired, be provided for the inner end of said aperture for additional protection and to prevent the aperture being clogged by fuel or ashes.

I prefer to admit the current of water or other cooling medium adjacent to the bottom of the fuel retarding member and remove it from adjacent to the top thereof, as by that means the cooler portion of the passage is presented to the hottest part of the fuel retarding member, that next to the fire, and also the water becoming heated, rises naturally in the fuel retarding member.

In Fig. 7 I show a fuel retarding member whose inlet pipe 16 and outlet pipe 14 are led through the trunnion 12 cast around the same, thus doing away with the large opening 13 in the furnace wall, an aperture sufficient to accommodate the trunnion being all that is required in this case. In case of a single boiler where access to the exterior of both side walls of the fire chamber can be had, I may use the design of fuel retarding member shown in Fig. 10, in which trunnion 9 is also extended clear through the side wall and cast about outlet 14 which is led therethrough to the outside of the furnace.

If desired the aperture 13 may be of sufficient size to permit the withdrawal of the fuel retarding member therethrough when desired, or the same may be bricked up to the size required in operation and the brick work taken down when the removal of the fuel retarding member is desired. Where a battery of more than one boiler is in use and it is inconvenient to extend trunnion 12 with its arm 18 and lever 19 without the side wall in the open air, I may make the side wall duplex, having a chamber therein extending to the front of the furnace, in which the water connections may be led into attachment with inlet 16 and outlet 14 and the arm 18 and lever 19 could work.

In Figs. 12 and 13 I show my fuel retarding member adapted for vertical movement above the grate instead of swinging as above described. The construction of the fuel retarding member is internally practically the same as above described with the trunnions omitted, the fuel retarding member, however being of somewhat greater length than the interior width of the furnace. One extremity, as the left in Fig. 13 is seated in recess 28 in the inner face of the side wall, said recess being of sufficient width to accommodate the fuel retarding member and of a height sufficient to allow proper vertical movement of the same as hereafter explained. The other extremity of the fuel retarding member is seated in the aperture 29, extending through the side wall and of corresponding width and height as recess 28. Through said aperture 29 are led in the water connections similar to those described in connection with Figs. 1 and 2. 30—30 are shoes, preferably, integral with the lower surface of fuel retarding member 7 adjacent to the extremities thereof and engaged by the upper ends of rods 31—31 which are located in vertical passages 32—32 in the side walls of the furnace. 33—33, one only being shown, are arms having at their free ends suitable seats for the lower extremities of rods 31—31 and rigidly attached to rock shaft 34 which traverses the ash pit of the furnace and is journaled at its ends in journal blocks 35—35, built into the walls of the furnace, one only of which is shown in Fig. 13. 36 is an arm rigidly attached to rock shaft 34 and whose upper, free extremity is pivoted to connecting rod 37 which rod extends through the front of the ash pit and is pivoted at its outer end to arm or lever 38 which in turn is pivoted at its lower end to sector frame 39. 40 is a pawl of any usual design, pivoted to lever 38 and adapted to engage the sector teeth 41—41 of any desired member. 42 is a handle removably attachable to lever 38 to operate the same and removable so as to be taken off when not in use to prevent interfering with access to the fire chamber and ash pit. The normal position of this form of fuel retarding member is that shown in Figs. 12 and 13 where the fuel retarding member is seated on the bottom of recess 28 and aperture 29 at a distance above the grate sufficient to permit the ashes to escape thereunder. When it is desired to raise the fuel retarding member to any desired elevation above the grate, the lever 38 is drawn forward toward the right in Fig. 12, thus drawing forward arm 36, rocking shaft 34 and with it raising the free ends of arms 33—33, thus raising rods 31—31 and with them the fuel retarding member 7. When the fuel retarding member is raised to the desired degree, it may be locked in place by means of the pawl 40 engaging the proper tooth 41 on the sector. 43 is an apron or plate carried by the fuel retarding member and closing aperture 29 to prevent the inrush of cold air from the outside and the blocking the aperture with ashes or fuel. A similar apron, not shown, may be carried by the fuel retarding member to close the recess 28 to keep the same from being blocked with ashes or fuel.

For the sake of clearness I have illustrated my fuel retarding member as applied to use in connection with a traveling chain grate but it is evident that in any form of grate wherein the fuel moves from one point to another, my fuel retarding member will be a great benefit. As for instance with a Rooney stoker or grate wherein the grate is inclined from front to rear and the fuel gradually works down the inclined surface. In such case my fuel retarding member would be located at the rear or lower end of the grate and effectually retard the fuel and effect complete combustion.
I may omit the passages for water or other cooling liquid, if desired, thus making saving in construction but I find that such construction burns out readily and that the water cooled type is much more economical in the end. I may also do away with the twyer pipe channels in the casting having the channels simply cast in the metal of the fuel retarding member, or again, I may simply provide a hollow casting to contain a body of water kept cool by constant circulation from without.
It is evident from the above description, that my invention performs new and beneficial improvements in fuel combustion, enabling more complete combustion to be effected and therefore doing away with waste of fuel and the production of smoke.
Other means from those shown may be substituted for rendering the fuel retarding member movable which will be within the scope of my invention but I regard the methods described as the most satisfactory.

Although for the sake of clearness, I have minutely described my invention as illustrated in the accompanying drawings, I do not wish to limit myself thereby but claim broadly:—

1. In a furnace in which the fuel is caused to travel within the combustion chamber, the combination of a fuel support, a fuel retarding device, means for adjusting said retarding device, to vary the distance between it and said fuel support and for securing it in its adjusted position.

2. In a furnace in which the fuel is caused to travel within the combustion chamber, the combination of a fuel support, a hollow fuel retarding device, means for circulating a cooling agent through said retarding device, means for adjusting said retarding device, to vary the distance between it and said fuel support, and for securing it in its adjusted position.

3. In a furnace in which the fuel is caused to travel within the combustion chamber, the combination of a fuel support, a hollow fuel retarding device provided with journals arranged at one side of its axial line, means for circulating a cooling agent through said retarding device, said cooling agent being introduced through one of said journals, and means for adjusting said retarding device, to vary the distance between it and said fuel support, and for securing it in its adjusted position.

4. In a furnace in which the fuel is caused to travel within the combustion chamber, a fuel support, a fuel retarding device having its extremities supported from the side walls of said furnace, means for adjusting said fuel retarding device to vary the interval between the lower surface of the same and said fuel support and means for securing the fuel retarding device in its adjusted position.

5. In a furnace in which the fuel is caused to travel, a fuel-support, an adjustable fuel-retarding member located above said support, means for adjusting said member relative to said fuel-support, and means for locking the same in the desired position.

6. In a furnace in which the fuel is caused to travel within the combustion chamber, a fuel support, a fuel retarding member mounted above and adjacent to the rear of said fuel support, trunnions at the extremities of said member journaled in the walls of said furnace, means for locking said member in its operative position and means for varying the interval between said member and said fuel support.

7. In a furnace in which the fuel is caused to travel within the combustion chamber, the combination of a fuel support, a fuel retarding member supported, when in its operative position, at an interval above said fuel support, means for securing said member in its operative position and means for adjusting said member to vary the interval between the same and said fuel support.

8. In a furnace in which the fuel is caused to travel within the combustion chamber, the combination of a fuel support, an adjustable fuel retarding member supported above said fuel support and independently thereof, means for adjusting the position of said member relative to said fuel support and means for securing said member in the desired position.

9. In a furnace in which the fuel is caused to travel within the combustion chamber during combustion, the combination of a fuel support, a member pivotally supported above said fuel support and independently thereof and adapted to unyieldingly retard the travel of the fuel on said fuel support and means for varying the distance between said member and said fuel support, for the purposes described.

10. In a furnace in which the fuel is caused to travel within the combustion chamber during combustion, a fuel support and a pivoted member supported at an interval above said fuel support and adapted to unyieldingly retard the travel of the fuel on said fuel support, for the purposes described.

11. In a furnace in which the fuel is caused to travel within the combustion chamber during combustion, the combination of a fuel support, and a member pivotally supported by its extremities at an interval above said fuel support and adapted to unyieldingly retard the travel of the fuel on said fuel support, for the purposes described.

12. In a furnace in which the fuel is caused to travel within the combustion chamber during combustion, a fuel support, and a member pivotally supported by its extremities from the side walls of the furnace at an interval above said fuel support and adapted to unyieldingly retard the travel of the fuel on said fuel support, for the purposes described.

13. In a furnace in which the fuel is caused to travel within the combustion chamber during combustion, a fuel support and a water cooled fuel retarding member having trunnions whereby said member is pivotally supported at an interval above said fuel support, one of said trunnions being hollow to form a water passage communicating with the interior of said member, for the purpose described.

14. In a furnace in which the fuel is caused to travel within the combustion chamber during combustion, a fuel support, and a water cooled member having trunnions at the ends thereof and supported at an interval above said fuel support and adapted to unyieldingly retard the travel of the fuel on said fuel support and means for maintaining a current of water through said member, for the purposes described.

15. In a furnace in which the fuel is caused to travel within the combustion chamber during combustion, a fuel support, a water cooled member provided with trunnions whereby it is supported at an interval above said fuel support and adapted to unyieldingly retard the travel of the fuel on said fuel support, and means for passing a current of water through said trunnions, for the purposes described.

16. In a furnace in which the fuel is caused to travel within the combustion chamber during combustion, a fuel support and a water cooled fuel retarding member having trunnions whereby said member is pivotally supported at an interval above said fuel support, said member being provided with water channels from bottom to top thereof, for the purpose described.

Signed at Pittsburg Pa. this 28th day of January 1905.

GEORGE L. JUNGE.

Witnesses:
EDWARD A. LAWRENCE,
A. M. KONSTANZER,